United States Patent [19]
Gore et al.

[11] 3,929,504
[45] Dec. 30, 1975

[54] RECHARGEABLE POWER SOURCE

[75] Inventors: Jon S. Gore, Lansdale; Charles R. Walk, Collegeville, both of Pa.

[73] Assignee: Honeywell Inc., Minneapolis, Minn.

[22] Filed: Dec. 18, 1974

[21] Appl. No.: 534,042

[52] U.S. Cl. .............................. 136/6 LN; 136/20
[51] Int. Cl.² .................................. H01M 10/00
[58] Field of Search ........ 136/20, 6 LN, 100 R, 146

[56] References Cited
UNITED STATES PATENTS

| | | | |
|---|---|---|---|
| 2,185,586 | 1/1940 | Brooks | 136/146 X |
| 2,877,136 | 3/1959 | Booth | 136/146 X |
| 3,043,896 | 7/1962 | Herbert et al. | 136/6 LN |
| 3,380,855 | 4/1968 | Mahy et al. | 136/100 R |
| 3,585,081 | 6/1971 | Mirman | 136/146 |
| 3,658,592 | 4/1972 | Dey | 136/6 LN |
| 3,730,771 | 5/1973 | Tannenberger et al. | 136/6 LN |
| 3,773,558 | 11/1973 | Charbonnier et al. | 136/6 LN |
| 3,808,052 | 4/1974 | Dey | 136/20 |
| 3,829,330 | 8/1974 | Dey | 136/20 X |

Primary Examiner—Howard S. Williams
Assistant Examiner—G. F. Lefevour
Attorney, Agent, or Firm—Charles J. Ungemach; Albin Medved; John S. Munday

[57] ABSTRACT

A new power source capable of operating in a discharge mode and in a charge mode, including a lithium anode, a vanadium pentoxide cathode and an electrolyte including lithium perchlorate dissolved in propylene carbonate. Also included is a means for enclosing one of the electrodes with a permeable material to permit passage of electrolyte ions and yet prevent passage of larger lithium metal formed during operation in the charge mode.

5 Claims, 1 Drawing Figure

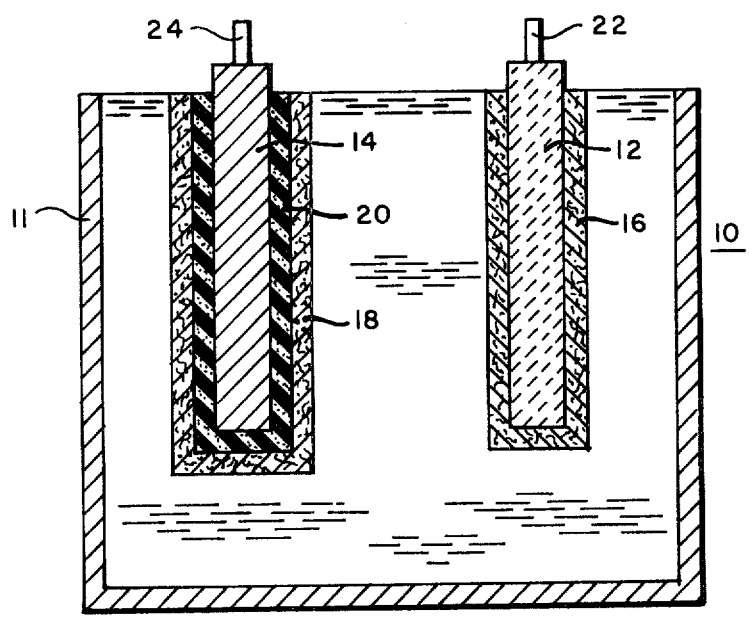

RECHARGEABLE POWER SOURCE

BACKGROUND OF THE INVENTION

Rechargeable or secondary batteries such as the ordinary automobile battery, and other batteries useful in radios, tape recorders and other electronic equipment, have found a wide acceptance as a useful source of energy. However, each of these presently known secondary batteries have their own limitations such as, for example, the great weight of the lead acid batteries used in automobiles.

As the world increases its desire for electrical energy and as more and more sophisticated electronic equipment is developed which is useful with its own self-contained energy source, the limitations of the conventional and well known secondary batteries become more important. Many new applications for electronic devices could be developed if a power source were available which would be significantly lighter in weight, have a higher energy density, and operate over a wider temperature range.

One source of electrical energy which has recently become quite important in the electrical power generation industry is the family of batteries known as lithium batteries. Lithium batteries, which are broadly defined as any nonaqueous battery employing lithium as an anode, have become important sources of electrical energy in the form of primary batteries. Primary batteries, of course, are those batteries which are capable of producing electrical current by an electro-chemical reaction. These cells are capable of operating only in the discharge mode. Development of secondary batteries, which are cells capable of operating both in the discharge mode and in the charge mode, so as to permit multiple reuses of the cell have not been developed.

Accordingly, it is an object of this invention to provide an electro-chemical source which is capable of being recharged a number of times.

Another object of this invention is to provide a lithium battery capable of being cycled between the discharge mode and charge mode for a significant number of cycles.

Other objects will appear hereinafter.

It has now been discovered that a rechargeable or secondary battery employing a lithium anode may be produced in the following manner. Basically, this secondary energy cell, which is capable of operation in the discharge mode and in the charge mode, comprises a lithium anode, a vanadium pentoxide cathode, and an electrolyte including lithium perchlorate dissolved in propylene carbonate. The cell further includes a means for enclosing at least one electrode, with this means having a permeability to permit passage of electrolyte ions during both the charge and discharge mode operation, and yet prevent migration of lithium metal from the anode during formation of lithium at the anode during operation of the cell in the charge mode.

Specifically, it has been discovered that a lithium battery of the type described may be operated as a secondary battery if there is a means enclosing at least one electrode, and preferably the lithium anode by a porous member surrounding the lithium anode in close relationship therewith to prevent lithium metal from depositing other than on said anode during operation of the cell in the charge mode. It has been discovered that a significant number of cycles of charge and discharge may be obtained using the anode, cathode and electrolyte described above. Particularly preferred is a one molar solution of lithium perchlorate dissolved in propylene carbonate.

The porous member which is employed to enclose one of the electrodes to permit passage of electrolyte ions and prevent migration of lithium metal can, in a preferred embodiment, comprise a flexible porous material which is inert to the anode, cathode and electrolyte. The pore size of this material should range from approximately 0.3 micron to approximately 30 micron. Particularly preferred is a natural rubber material having an average pore size of about 2 micron.

DESCRIPTION OF THE DRAWING

For a more complete understanding of the present invention, reference is hereby made to the drawing, which comprises a single FIGURE showing a sectioned view of a battery according to the present invention.

In the FIGURE, the cell is generally shown by reference numeral 10. The cell includes an outer casing 11, which in the preferred embodiment is hermetically sealed against the outside environment. Contained within the outer portion 11 is a cathode 12, comprising vanadium pentoxide, and an anode 14, comprising lithium metal. Electrical leads 22 and 24 are attached to the cathode and anode respectively for storing and withdrawing current during operation in the charge and discharge mode.

The cathode 12 is surrounded by and enclosed in a fiberglass jacket 16. A similar fiberglass jacket 18 surrounds the anode 14. Also associated with the anode 14 is a porous member 20 in close relationship with the anode 14, which has a porosity sufficient to permit passage of electrolyte ions during operation of the cell. The porosity of the porous member 20 is sufficient to permit the flow of electrolytic ions but is further capable of prevention of lithium metal from migrating away from the anode.

EXPERIMENTAL RESULTS

A number of cells were prepared to demonstrate the efficiencies of the present invention. An anode was prepared by forming the lithium metal ribbon pressed on to an expanded copper metal grid or conductor material. The cathode was prepared by forming in a mold a quantity of vanadium pentoxide, sufficient graphitic carbon to act as a conductor and a quantity of binder in a suitable solvent. This molded cathode was pressed and then vacuum dried to remove all the solvent, allowing the binder to firm up or solidify the mixture into a usable cathode material. A stainless steel metal grid was employed as a conductive cathode grid for the cathode.

A plurality of cells were manufactured according to this method and were tested in the following manner. Each of the cells were included in a testing circuit which provided for discharge of the cell for an eight hour period at a constant current of known quantity, followed by a charge mode operation at a constant current known to be half that of the discharge current for a sixteen hour charging cycle. Thus, each 24 hours, the complete cycle of discharge and charge was achieved.

A number of cells were prepared using the above testing method to determine the number of cycles obtainable for various electro-chemistries. The theoretical capacity of the positive electrode was calculated to determine the amount of current in terms of milliamp hours available for discharge of one electron to prevent any undesirable side reactions which might occur. The cycle was planned with the size of the cell to permit a discharge to forty percent of the theorectical capacity for one electron discharge.

In the first cell, the electro-chemistry of the present invention, employing a lithium anode, a vanadium pentoxide cathode, and an electrolyte of lithium perchlorate in propylene carbonate was operated for a series of 75 cycles. Using this same anode and cathode, and using a wide variety of different electrolytes in 18 other experiments, no cell was found which could operate at as many as 40 cycles. In fact, these 18 cells averaged only slightly more than 13 cycles before the closed circuit voltage of the cell dropped from the original 3.4 volts to below 2.5 volts. The cell of the present invention was capable of operating for more than five times as many cycles before reaching the cutoff voltage of 2.5 volts.

Further experiments were conducted using the present invention to determine if a significant increase in the number of recharge cycles could be obtained. A new cell was constructed employing a flexible porous material made from natural rubber (as well as the inert glass material) and having an average pore size of approximately 2 micron. This material enclosing the anode was manufactured by Amerace Corporation, Microporous Products Division, Butler, New Jersey, 07405. Type — ACE-SIL, Thickness — 0.030 inch, Grade — natural rubber with 28 percent silica, Pore Size — 2 micron average.

This cell was then operated to a depth of discharge of twenty five percent of the amount of current necessary to discharge one electron, based on the theoretical capacity of the cathode. This cell was operated on an 8 hour discharge—16 hour charge cycle totalling 24 hours for a total of 386 cycles. The cell was capable of operating at above 2.5 volts from an initial 3.4 volts for 360 cycles and was at approximately 2.0 volts on the 386th cycle.

This cell was operated at a constant current of 6.6 milliamps during discharge. Results of the discharge profile over the eight hour period for representative cycles are shown in Table I.

TABLE I

| | DISCHARGE PROFILE | | | | |
|---|---|---|---|---|---|
| HOURS | \multicolumn{5}{c}{Cycle Number, Voltage at 6.6 ma Constant Current} |
| | 50th | 150th | 300th | 350th | 386th |
| 0 | 3.40 | 3.20 | 3.30 | 3.30 | 3.40 |
| 2 | 3.20 | 3.10 | 3.20 | 3.15 | 3.10 |
| 4 | 3.15 | 3.00 | 3.10 | 3.10 | 3.10 |
| 6 | 3.10 | 2.95 | 3.00 | 2.90 | 2.30 |

TABLE I-continued

| | DISCHARGE PROFILE | | | | |
|---|---|---|---|---|---|
| HOURS | \multicolumn{5}{c}{Cycle Number, Voltage at 6.6 ma Constant Current} |
| | 50th | 150th | 300th | 350th | 386th |
| 8 | 3.00 | 2.95 | 2.90 | 2.70 | 2.00 |

The cell was charged at a constant current of 3.5 milliamps for 16 hours during each cycle. Representative data for various representative cycles is shown below in Table 2.

TABLE II

| | CHARGE PROFILE | | | | |
|---|---|---|---|---|---|
| HOURS | \multicolumn{5}{c}{Cycle Number, Voltage at 3.5 ma Constant Current} |
| | 50th | 150th | 300th | 350th | 386th |
| 0 | 3.20 | 3.15 | 3.30 | 3.35 | 3.40 |
| 4 | 3.30 | 3.25 | 3.45 | 3.50 | 3.55 |
| 8 | 3.40 | 3.30 | 3.50 | 3.55 | 3.60 |
| 12 | 3.45 | 3.35 | 3.55 | 3.60 | 3.65 |
| 16 | 3.50 | 3.45 | 3.60 | 3.95 | 4.00 |

It has now been shown that a useful secondary battery may be constructed according to the present invention. This cell may be constructed as a useful battery capable of being reused over and over again. The particular configuration of the cell will depend entirely upon the application for which it is intended, since the shape and size of the cell may vary without departing from the scope of the present invention.

Having thus described the invention, what is claimed is:

1. A secondary energy cell capable of operating in the discharge mode and in the charge mode, comprising:
   a lithium anode;
   a vanadium pentoxide cathode;
   an electrolyte including lithium perchlorate dissolved in propylene carbonate; and
   means for enclosing at least one electrode, said means having a permeability to permit passage of electrolyte ions and prevent migration of lithium metal from said anode.

2. The cell of claim 1 wherein said means for enclosing at least one electrode includes a porous member surrounding said lithium anode in close relationship therewith to prevent lithium metal from depositing, other than on said anode, during operation of said cell in the charge mode.

3. The cell of claim 1 wherein said electrolyte comprises a 1 molar solution of lithium perchlorate dissolved in propylene carbonate.

4. The cell of claim 1 wherein said porous member comprises a flexible porous material inert to the anode, cathode and electrolyte, said material having a pore size ranging from 0.3 micron to 30 micron.

5. The cell of claim 4 wherein said porous material is a natural rubber composite having an average pore size of about 2 micron.

* * * * *